United States Patent [19]

Flantua

[11] 4,174,554
[45] Nov. 20, 1979

[54] BAG CLOSURE

[75] Inventor: Gysbertus Flantua, Grimsby, Canada

[73] Assignee: Bonar & Bemis Ltd., Canada

[21] Appl. No.: 924,725

[22] Filed: Jul. 14, 1978

[51] Int. Cl.² .............................................. B65D 77/10
[52] U.S. Cl. ................................ 24/30.5 P; 24/129 B
[58] Field of Search ........... 24/30.5 R, 30.5 P, 16 PB, 24/204, 129 B, 201 A

[56] References Cited
U.S. PATENT DOCUMENTS

| | | | |
|---|---|---|---|
| 3,410,397 | 11/1968 | Cato | 24/204 X |
| 3,673,640 | 7/1972 | Brown | 24/30.5 R |

Primary Examiner—Philip C. Kannan
Attorney, Agent, or Firm—Roylance, Abrams, Berdo & Farley

[57] ABSTRACT

A bag closure for polyethylene bags of the "pony-tail" variety is disclosed. The closure is reusable, easy to manufacture and use, prevents the bag from inadvertently opening, and is amenable to printing thereon. It comprises a base portion and a tongue portion formed thereform and integrally connected thereto. Adjacent the connection between the base and tongue portions the tongue has a pair of opposed neck areas and the minimum width of the opening in the base portion created by formation of the tongue portion is substantially equal to the minimum distance between the neck areas. In use the bunched bag sides are trapped between the tongue and base portions, the base portion is bent around the bunched bag sides and the tongue portion is drawn or pulled through the opening until the adjacent edges or the opening lockingly engage the neck areas of the tongue when the bag is fully encompassed. The closure can be released to permit opening of the bag and can be re-locked to again fully close the bag.

2 Claims, 2 Drawing Figures

U.S. Patent  Nov. 20, 1979  4,174,554
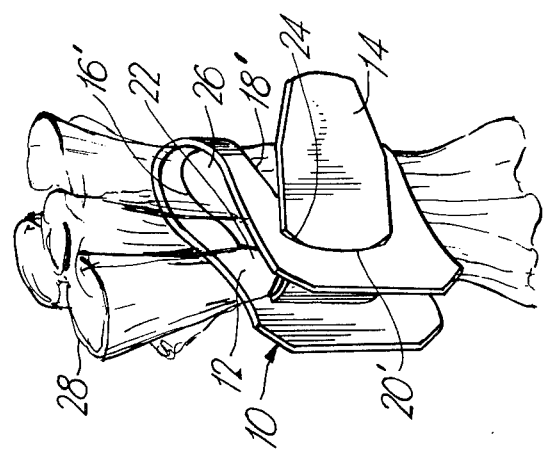
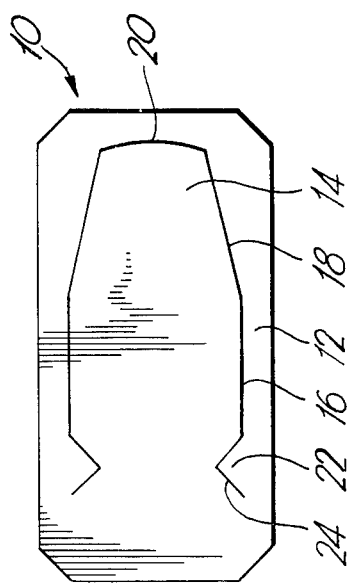

BAG CLOSURE

BACKGROUND OF THE INVENTION

The present invention relates to bag closures in general and to closures for "poly" bags in particular.

Many industries utilize polyethylene or other thin plastic bags to package commodities, one of the most common industries being the food industry. Many foodstuffs are packaged in this way, for example, bread and milk. Most consumers are well-acquainted with the "pony-tail" bread bag and most are aquainted with the overbag containing a number of 1-quart pouches of milk. In both instances, it is necessary to open and close the covering bag a number of times before the contents thereof are exhausted. This means that a bag closure which can be positioned by automatic machinery and which can be removed and reused by the consumer must be provided. Many such closures have been proposed and many are in commercial use. For example, there is a closure made from a sheet of plastics material and having a C-shaped opening at one end. The bunched bag sides are positioned in the opening and the edge thereof retains the bag sides therein. This closure has the disadvantage that during handling portions of the bag sides can slip through the open area of the closure allowing air to enter the bag and perhaps allowing bag contents to eventually leave the bag. Also, the size of the opening in the closure must be tailored to the size of the bag to be closed. If the opening is too big or too small an improper closure will result.

An improved closure is found in U.S. Pat. No. 3,673,640 issued on July 4, 1972 to Dwight C. Brown. That closure includes a bowed strap and a clamping bar struck from the interior thereof and hinged at one end to the strap. A locking hook is provided at the other end of the bar for engagement with an edge of the strap in the opening left by the bar. The bunched bag sides are locked between the bar and the strap when the hook has engaged the strap. This closure eliminates any problems of inadvertent bag opening and also permits greater latitude in the size of the bag that can be closed thereby. However the tooling to produce the closure is expensive as the closure is complex in configuration, requiring a number of steps to bow the strap, form the clamping bar and form the hook thereon. The configuration also fails to provide areas for imprinting, an important feature with respect to mounting consumer interest in price, quality, weight and dates of latest use.

SUMMARY OF THE INVENTION

The present invention overcomes the problems associated with the above described closures. It is simple, easy to manufacture, prevents inadvertent bag opening, accomodates a great variety of bag sizes and lends itself to imprinting. The bag closure of the present invention is stamped from a flat sheet of plastics material and remains flat until use. It has a flat base portion and a flat tongue portion stamped from the base but hinged thereto. Adjacent the hinge area the tongue portion has a pair of opposed neck areas and at the free end the side edges of the tongue portion converge slightly. When used the tongue portion is pushed out from the base portion and the bunched bag sides are positioned therebetween. The base portion is bent around the bunched bag sides and the tongue portion is pulled through the opening created by pushing the tongue portion from the base portion. The tongue portion is pulled (or pushed) through the opening until the neck areas engage the converging edges of the opening in the base portion, thereby locking the closure about the bunched bag sides. The tongue portion can be easily released or unlocked by simply disengaging the edges of the opening in the base portion from the neck areas of the tongue portion and drawing the tongue portion back through the opening in the base portion. The closure can be reused as often as desired without fear of failure. Also the tongue surface area readily lends itself to imprinting.

Broadly speaking therefore, the present invention provides a bag closure comprising a base portion and a tongue portion formed from the base portion, said tongue portion having an integral hinge connection with said base portion and a pair of opposed neck areas adjacent said hinge connection, and said base portion having an opening corresponding to said tongue portion and having a minimum width substantially equal to the minimum distance between said neck areas.

BRIEF DESCRIPTION OF THE DRAWINGS

FIG. 1 illustrates a plan view of the bag closure according to the present invention.

FIG. 2 illustrates the bag closure of the present invention in use.

DESCRIPTION OF THE PREFERRED EMBODIMENT

FIG. 1 shows an enlarged plan view of the bag closure according to the present invention. The bag closure 10 includes a base portion 12 which in an unused state is generally flat, the base portion 12 being provided with a tongue portion 14 which is stamped or struck therefrom. The tongue portion 14 is delineated by a pair of opposed parallel edge sections 16, a pair of opposed converging edge sections 18, a curved edge section 20 joining edge sections 18 and a pair of opposed inwardly directed neck areas 24 adjacent the integral hinge connection between the tongue portion 14 and the base portion 12. The neck areas 24 correspond to a pair of opposed projections 22 on the base portion, the projections 22 being directed inwardly towards each other. While the projections 22 are shown as being generally triangular in plan they can take any form such as circular or rectangular.

As seen in FIG. 2 the base portion has an opening 26 that corresponds to the tongue portion 14 and is delineated by corresponding edge sections 16', 18' and 20'. The minimum width of opening 26 in the vicinity of edge sections 18' is substantially equal to the minimum distance between the neck areas 24.

The closure of the present invention may be formed from a sheet of a plastics material in a simple stamping press, the punch and die of which could simultaneously or progressively stamp the outline of the base 12 and the outline of the tongue 14. It is also possible to stamp the closures progressively in a continuous strip of plastics material, which strip of closures could be rolled up for use in automatic packaging equipment. Thus, a closure would be struck from the roll as required. Alternatively it would also be possible to stamp out the closure just prior to use from a roll or strip of plastics material, the stamping press in this case adjoining the packaging equipment. The material may be any of the flexible yet strong plastics such as polyethylene.

In use, the tongue portion 14 is initially pushed from the base portion, the tongue being hinged at its junction with the base. This leaves an opening 26 in the base portion 12 corresponding to the shape of the tongue portion 14. The base portion 12 and the tongue portion 14 when pushed from the base portion, form a V-shaped zone into which the bunched bag sides 28 are moved. The base portion 12 is wrapped around the bunched bag sides as seen in FIG. 2 and the tongue portion 14 is moved through the opening 26 in the vicinity of the converging edges 18' thereof so that when the tongue is pulled through the opening 26 the converging edges 18' of the opening 26 will engage the neck areas 24 on the tongue thereby locking the closure about the bunched bag sides. Since the bag closure is intended to tightly close the bag there will be resistence to closure provided by the bunched bag sides and the outwardly directed forces produced thereby will tend to enhance the engagement between edges 18' and neck areas 24.

In order to release the closure it is only necessary to release the engagement between edges 18' and neck areas 24 which can be easily accomplished by slightly twisting tongue portion 14 and withdrawing the tongue portion back through opening 26. Needless to say the closure of the present invention may be used over and over again as there are no zones thereon which will be subject to high fatigue stresses during opening and closing thereof.

The relatively large flat surface of the tongue portion 14 lends itself to printing and this becomes a convenient area for price or other information pertaining to the product.

The present invention accordingly provides a bag closure which is highly efficient, effective in use, and economic to produce. It has large areas for printing thereon while being compact in size and it can therefore be unobstrusive when in use. It is also conceivable that detail changes in the design of the present bag closure could be effected without departing from the basic concept and hence the protection to be afforded the present invention should be determined only from the appended claims.

The embodiments of the invention in which an exclusive property or privilege is claimed are defined as follows:

1. A reusable bag closure comprising a base portion and a tongue portion formed from the base portion, said tongue portion having an integral hinge connection with said base portion and being defined by a pair of opposed inwardly directed neck areas adjacent said connection, a pair of opposed parallel edge sections connected to said neck areas, a pair of opposed converging edge sections connected to said parallel edge sections and a curved end section connecting said converging edge sections, said base portion having an opening corresponding to said tongue portion, said opening having a minimum width substantially equal to the minimum distance between said neck areas.

2. A bag closure according to claim 1 which is formed from a plastics material.

* * * * *